United States Patent [19]

Hammond et al.

[11] 4,257,867

[45] Mar. 24, 1981

[54] INERT GAS REJECTION DEVICE FOR ZINC-HALOGEN BATTERY SYSTEMS

[75] Inventors: Michael J. Hammond, Sterling Heights; Mark W. Arendell, Warren, both of Mich.

[73] Assignee: Energy Development Associates, Inc., Madison Heights, Mich.

[21] Appl. No.: 134,928

[22] Filed: Mar. 28, 1980

[51] Int. Cl.³ .................... C25B 9/00; C25B 11/03; C25B 11/12
[52] U.S. Cl. .................................. 204/265; 204/266; 204/283
[58] Field of Search .............. 204/258, 260, 266, 278, 204/282, 283, 265

[56] References Cited
U.S. PATENT DOCUMENTS

| | | | |
|---|---|---|---|
| 3,813,301 | 5/1974 | Carr | 429/50 |
| 3,827,964 | 8/1974 | Okubo | 204/283 |
| 3,855,104 | 12/1974 | Messner | 204/258 |
| 3,909,298 | 9/1975 | Carr | 429/218 |
| 3,954,502 | 5/1976 | Symons | 429/39 |
| 4,118,305 | 10/1978 | Oloman | 204/265 |
| 4,217,401 | 8/1980 | Pellegri | 204/266 |

Primary Examiner—T. M. Tufariello
Attorney, Agent, or Firm—Harness, Dickey & Pierce

[57] ABSTRACT

An electrolytic cell for separating chlorine gas from other (foreign) gases, having an anode, a cathode assembly, an aqueous electrolyte, a housing, and a constant voltage power supply. The cathode assembly is generally comprised of a dense graphite electrode having a winding channel formed in the face opposing the anode, a gas impermeable (but liquid permeable) membrane sealed into the side of the cathode electrode over the channel, and a packing of graphite particles contained in the channel of the cathode electrode. The housing separates and parallelly aligns the anode and cathode assembly, and provides a hermetic seal for the cell. In operation, a stream of chlorine and foreign gases enters the cell at the beginning of the cathode electrode channel. The chlorine gas is dissolved into the electrolyte and electrochemically reduced into chloride ions. The chloride ions disfuse through the gas impermeable membrane, and are electrochemically oxidized at the anode into purified chlorine gas. The foreign gases do not participate in the above electrochemical reactions, and are vented from the cell at the end of the cathode electrode channel.

29 Claims, 7 Drawing Figures

INERT GAS REJECTION DEVICE FOR ZINC-HALOGEN BATTERY SYSTEMS

BACKGROUND AND SUMMARY OF THE INVENTION

The present invention relates generally to electrolytic cells, and particularly cells where chlorine gas is reduced at the cathode electrode and chloride ions are oxidized at the anode electrode.

One known application for such a cell, also referred to as a chlorine-chlorine cell, is the separation of chlorine gas from a stream of chlorine and foreign gases. Such foreign gases could include, but are not limited to, carbon dioxide, oxygen and hydrogen gases. Although the chlorine-chlorine cell separation technique could be useful in the manufacture of chlorine gas, the principal application herein relates to zinc-halogen batteries, such as a zinc chlorine battery. In the zinc-chlorine battery application, the foreign gases are also referred to as inert gases. This is because these gases are inert in the hydrate formation process whereby chlorine is stored in the battery. During the charging of a zinc-chlorine battery, chlorine gas is evolved at the positive electrode (anode) and zinc metal is deposited on the negative electrode (cathode). Thus, inside the battery casing, the environment is necessarily a chlorine gas environment. However, small quantities of other gases may also be present inside the battery case. For instance, carbon dioxide is evolved during normal operation of the battery as a by-product of the oxidation of the battery graphite. The volumetric rate of carbon dioxide evolution during battery charging is approximately 0.02% to 0.04% of the chlorine gas evolution rate. Consequently, if the carbon dioxide is not purged from the battery system, it will accumulate over a period of charge/discharge cycles, and eventually interfere with the normal operation of the battery.

Two known cells of this type are described in a co-filed U.S. Patent Application entitled "An Electrolytic Cell For Separating Chlorine Gas From Other Gases", assigned to the assignee of the present invention. The first cell was comprised of two porous (gas permeable) graphite electrodes, separated by an asbestos membrane saturated with an aqueous zinc-chloride electrolyte. The chlorine and foreign gases were passed into the cell through the cathode electrode, and the purified chlorine gas was passed out of the cell through the anode electrode. The foreign gases and unreacted chlorine gas were vented from the gap between the cathode electrode and asbestos membrane at the top of the cell. This early proof of principal cell provided a 50%-60% recovery of chlorine gas from the input gas mixture. Thus, approximately one half of the chlorine gas entering the cell was being vented with the foreign gases. A discussion of this cell and the zinc-chlorine battery application may also be found in: Development of the Zinc-Chlorine Battery for Utility Applications, Interim Report, April 1979, pages 36-9, 12, published by the Electric Power Research Institute, Palo Alto, Calif., and is herein incorporated by reference.

The second cell was a cylindrical design, where the anode electrode was a cylinder and the cathode electrode was a rod coaxially disposed in the anode. Both the anode and the cathode electrodes were made from dense graphite (gas and liquid impermeable). The concent of a cathode assembly was also introduced with this cell design. The cathode assembly was comprised of the cathode electrode, a porous graphite (gas impermeable, but liquid permeable) membrane cylinder interposed between the anode and cathode electrodes, and a quantity of graphite powder packed between the membrane cylinder and the cathode electrode. Thus, the cathode electrode rod was coaxially disposed in the membrane cylinder, and the membrane cylinder was coaxially disposed within the anode electrode cylinder. The cathode assembly had a gas inlet (for the chlorine and foreign gases) at the bottom of the cell, and a gas outlet (to vent the foreign and unreacted chlorine gases) at the top of the cell. However, the cathode was otherwise sealed to prevent the foreign gases from mixing with the purified chlorine gas generated at the anode. The electrolyte was an aqueous hydrochloric acid electrolyte.

Another known cell, herein referred to as the third cell, was generally comprised of two flat-plate anode electrodes and a common cathode assembly interposed between them. As in the second cell design, the electrodes were made from dense graphite. The cathode assembly was comprised of a flat-plate cathode electrode, a flat-plate porous graphite membrane disposed on each side of the cathode electrode, and a graphite powder packing between the membranes and the cathode electrode. A housing was used to align the electrodes and membranes in parallel, and also to provide a means for sealing the cathode assembly.

Although both the second and third cells provided a higher efficiency (more chlorine gas reacted per energy input) than the first cell, they also suffered some drawbacks. The most important of these drawbacks related to the third cell design, where within a short time the stream of chlorine and foreign gases woule cause passageways to form in the packed bed of graphite particles in the cathode assembly. Such gas passageways are undesirable for two reasons. First, as the graphite particles form the primary surface or sites for the reduction of chlorine gas, inactive areas or dead spots would be formed in the cathode assembly. Second, the gas passageways would naturally seek a path for the gas outlet at the top of the cathode assembly, and thus increase the amount of chlorine gas being vented from the cell with the foreign gases. These gas passageways were particularly detrimental to the third cell design, because the gas passageways would preferentially form on only one side of the cathode electrode. This resulted in the major portion of the input gas mixture flowing into the side of the cathode assembly with the gas passageways, and essentially starving the other side of gas flow.

Another drawback of these cells relates to the cathode assembly seal. In these cells, the housing was used in part to seal the cathode assembly at the top and bottom of the cell. The difficulty with this approach was in attaining a gastight seal between the plastic or lucite housing and the porous graphite membrane(s). If a gas tight seal is not achieved, the purpose of the cell is defeated because the foreign gases will diffuse into the anode section of the cell and mix with the purified chlorine gas being generated.

A further drawback relates to the rate at which the input gas mixture must be processed through the cell and also the size of the cell. When the gas flow rate into the cell is very low, even an inefficient cell will be capable of reducing all or substantially all of the chlorine gas at the cathode. This is especially true if the applied voltage across the cell is relatively high (i.e.

about two volts), as it will keep the cathode very cathodic. However, when the gas flow rate is increased significantly, even an efficient cell may not be capable of reducing all of the chlorine gas. This results in unreacted chlorine gas being vented from the cathode assembly along with the foreign gases. This result is unacceptable because it is desirable to vent the foreign gases into the atmosphere. Thus, with relatively high gas flow rates it is a practical necessity to have more than one cell or stages in order to handle any overflow of unreacted chlorine gas from the cell. The subsequent cell would use as its input the outlet from the cathode assembly of the previous cell. In such a situation it would be important to have a cell design which would provide for the addition of one or more subsequent cells or stages in a readily manufacturable and economical manner. In reference to the zinc-chlorine battery application, there is the further constraint of the size of the cell(s). As it is desirable to locate the cell(s) inside the battery casing, the size of the cell(s) must be kept to a minimum. Since the second and third cell designs suffer inefficiencies at higher gas flow rates, subsequent cells or stages would be needed to insure a total removal of chlorine gas from the foreign gas vent than would be required in a more efficient cell design. However, these cell designs do not provide a compact structure when combined with further cells.

The present invention provides a cell design which substantially minimizes or eliminates the formation of gas passageways in the graphite packed bed, achieves an integral seal for the cathode assembly, and is readily adaptable to a compact multistage structure. Particularly, the present invention provides for a novel cathode assembly. The cathode assembly is generally comprised of a cathode electrode plate having a winding channel means formed in the face opposing the anode for directing the flow of gas through the cathode assembly, a porous graphite membrane sealed into the face of the cathode electrode over the channel means, and a packing of graphite particles contained in the channel means. The cathode assembly also includes an inlet port at the beginning of the channel means for receiving the chlorine and foreign gases, and an outlet port at the end of the channel means for venting the foreign gases from the cell. The anode is a flat-plate electrode made from dense graphite. A chemically inert non-conductive housing is used to separate the anode and cathode assembly a predetermined distance, and align them in parallel. The housing further serves to contain the electrolyte and hermetically seal the cell. The aqueous electrolyte is composed of dilute hydrochloric acid, preferably between 5% and 15% of the electrolyte by weight. A direct-current constant-voltage power supply is used to provide a potential difference across the anode and cathode electrodes sufficient to cause the chlorine gas reduction at the cathode and the chloride ion oxidation at the anode. Alternatively, the housing may be replaced by a non-conductive separator member interposed between the anode electrode and the cathode assembly, and means for sealing the anode electrode and cathode assembly to the separator member.

The present invention further provides for a novel multi-stage cell design. The multi-stage electrolytic cell is generally comprised of a single anode electrode and cathode assembly contained in a housing with an aqueous hydrochloric acid electrolyte. The cathode assembly is comprised of a single cathode electrode plate having a plurality of adjacent channel means formed in the face opposing the anode electrode, a corresponding plurality porous graphite membranes sealed into the face of the cathode electrode over the channel means, and a packing of graphite particles contained in each of the channel means. The cathode assembly further includes passage means formed in the face of the cathode electrode opposite to the channel means for connecting the end of the first or previous channel means with the beginning of the second or subsequent channel means.

Other features and advantages of the invention will become apparent in view of the drawings and the following detailed description of the preferred embodiments.

BRIEF DESCRIPTION OF THE DRAWINGS

FIG. 6 is a front elevation assembly view of a three-stage electrolytic cell according to the present invention.

DESCRIPTION OF THE PREFERRED EMBODIMENTS

Figure 1:
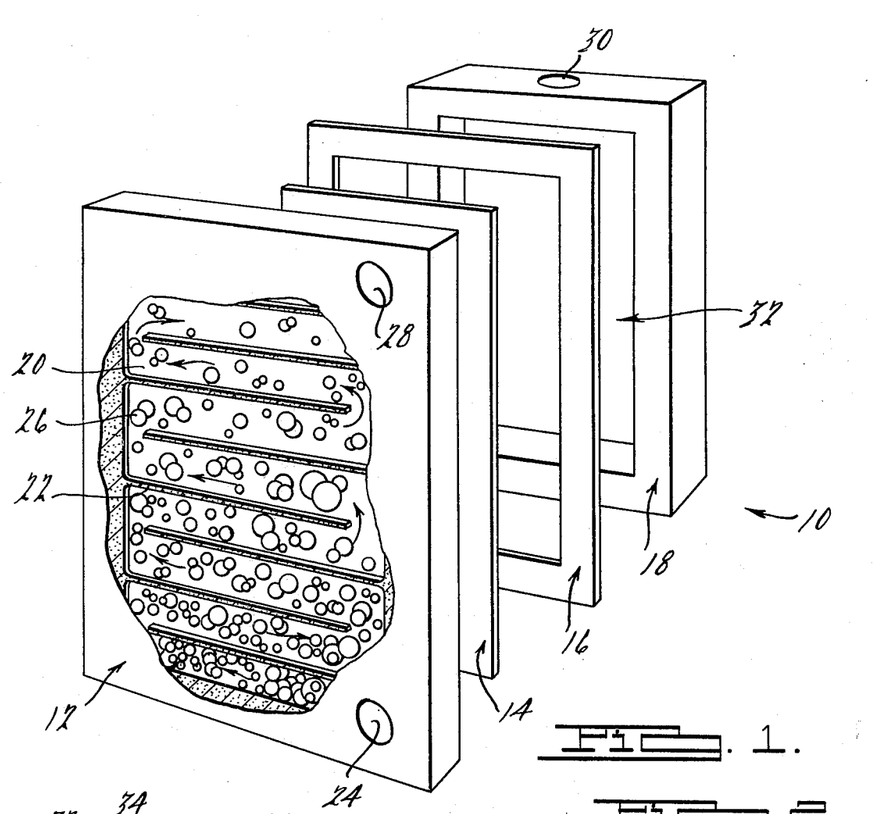
FIG. 1 is an exploded assembly view of a single stage electrolytic cell according to the present invention.

Referring to FIG. 1, a single-stage electrolyte cell 10 according to the present invention is shown. Electrolytic (or chlorine-chlorine) cell 10 is generally comprised of a cathode electrode 12, a membrane 14, a separator 16, and an anode electrode 18. Both cathode electrode 12 and anode electrode are made from dense or fine grained graphite, preferably Union Carbide Corp. CS grade graphite. Membrane 14 is made from porous graphite, preferably Union Carbide Corp. PG-60 graphite or Airco Speer 37-G graphite. However, the cathode and anode electrodes may also be constructed from any suitable electrically conductive material which is chemically resistent or inert to the electrolyte and other chemical entities with which it will come into contact. Thus, these electrodes may be constructed from ruthenized titanium. Membrane 14 may also be constructed from any suitable material which is liquid permeable but gas impermeable, and similarly chemically resistent or inert. Thus, membrane 14 may be constructed from asbestos, ceramics, or DuPont Nafion. Separator 16 is made from General Tire & Rubber Corp. Boltron polyvinyl chloride (4008-2124), but may also be constructed from any suitable electrically non-conductive material, which is similarly chemically resistent or inert. Thus, separator 16 may be constructed from such materials as DuPont Teflon (tetrafluorinated ethylene), or Pennwalt Kynar (polyvinylidene fluoride), or any of the other appropriate materials described in section 33 of the Development of the Zinc-Chlorine Battery for Utility Applications report identified earlier.

Formed in the face of the cathode electrode opposing the anode electrode is a winding channel 20, defined in part by ridges 22. Although not shown, channel 20 is packed with graphite powder or particles, which provide the primary surface or sites for the reduction of chlorine gas.

The graphite powder is made from activated Union Carbide Corp. PG-60 graphite. A description of the preferred process for activating graphite may be found in U.S. Pat. No. 4,120,774, issued Oct. 17, 1978, entitled "Reduction of Electrode Overvoltge", and is herein incorporated by reference. However, it should be understood that other electrically conductive, electrochemically active, and chemically resistive or inert materials may be employed as a substitute for the graphite powder, such as particles of carbon or ruthenized titanium. The graphite powder is held in the cathode electrode channel by membrane 14, which is fixedly secured into the face of the cathode electrode over the channel. A gas tight seal is provided between cathode electrode 12 and membrane 14 by applying a kynar adhesive (75% NN-dimethyl formamide) to the edges and surfaces to be joined. The sealing technique is generally comprised of heating the cathode electrode, applying the adhesive to the edges and surfaces to be joined, placing the membrane against the cathode electrode, and applying pressure to the cathode electrode and membrane so that the surfaces to be joined are in close contact. After an integral seal is achieved, the combination of cathode electrode 12 with channel 20, the graphite powder, and membrane 14, form a cathode assembly.

The stream of chlorine and foreign gases enters the cell and cathode assembly through inlet port 24. The chlorine gas 26 dissolves into the electrolyte which fills the cell, and is directed through the cathode assembly by channel 20, as indicated by the arrows. During this time, the dissolved chlorine gas is electrochemically reduced to chloride ions. However, the foreign gases do not participate in any electrochemical reactions. As the foreign gases are prevented from reaching the anode electrode due to the impermeability of membrane 14 to gas, they pass up the cathode assembly, and are vented from the cell through outlet port 28. Unreacted chlorine gas may also be vented through outlet port 28, depending in part upon the flow rate of the gases into the cell.

The chloride ions in the cathode assembly diffuse through the membrane, and are oxidized at anode electrode 18. The chlorine gas generated at the anode is vented from the cell through a second outlet port 30. Thus, the chlorine gas is separated from the foreign gases (or purified), and may be further utilized by connecting a suitable conduit to outlet port 30. As illustrated, a cavity 32 is formed in the face of the anode electrode opposing the cathode assembly, to provide for an appropriate intercell separation or gap. However, it should be understood that cavity 32 may be replaced by increasing the thickness of separator 16. The cathode and anode electrodes may be sealed to the separator by any suitable means, including kynar adhesive and electrically non-conductive bolts or clamps.

The electrolyte is preferably composed of a 10% by weight solution by hydrochloric acid in water. However, the hydrochloric acid concentration may be varied over a range from 5% to 30% without an appreciable affect on the performance of the cell. Alternate chloride ion containing electrolytes may also be provided, such as zinc chloride, potassium chloride or sodium chloride.

In order for the reduction of chlorine gas and oxidation of chloride ions to take place, a sufficient potential difference must be provided between the cathode and anode electrodes. Such potential difference may be in the range of 0.2 to 2.0 volts. Any suitable direct currect (constant voltage) power supply may be used which will provide an appropriate current density over the active surface area of the cell in the above-identified voltage range. Such a power supply should be capable of providing a current density up to 300 milli-amperes per square centi-meter of active (apparent) surface area.

Figure 2:
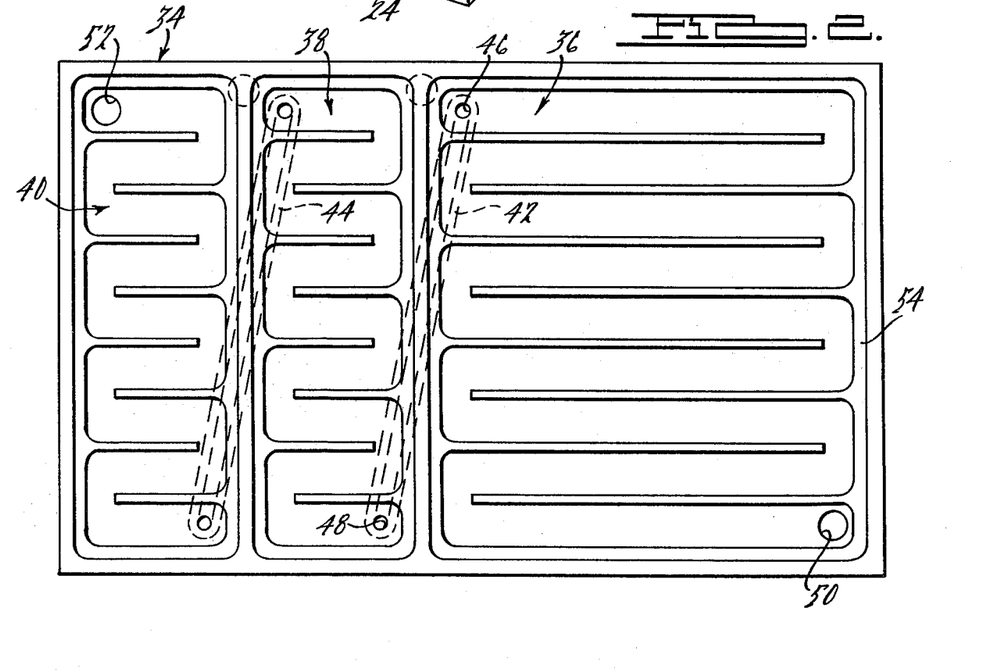
FIG. 2 is a front elevation view of the cathode electrode for a three-stage electrolytic cell according to the present invention.

Referring to FIG. 2, a cathode electrode 34 for a three-stage electrolytic cell is shown. A separate channel is provided for each stage in the cell. The first stage, designated by channel 36, has an active (apparent) surface area three times that of the other two stages. The second and third stages are designated by channels 38 and 40, respectively. In the preferred embodiment, the active (apparent) surface area of the first stage is 300 square centimeters, and 100 square centimeters a piece for the second and third stages. A passage means, formed in the face of the cathode electrode opposite to that of the channels, provides a connection between the channels. Passage means 42 connects the end 46 of the first stage channel 36 with the beginning 48 of the second stage channel 38. Passage means 44 provides a similar connection between the second and third channels. Thus, the three channels are connected in series, and any unreacted chlorine gas leaving the first channel must pass through the second channel, and so on to the third channel. Consequently, all of the chlorine gas entering the cell at inlet port 50 will be completely reacted, so that only the foreign gases are vented from the cell at outlet port 52.

Figures 3, 4, 5, 7:
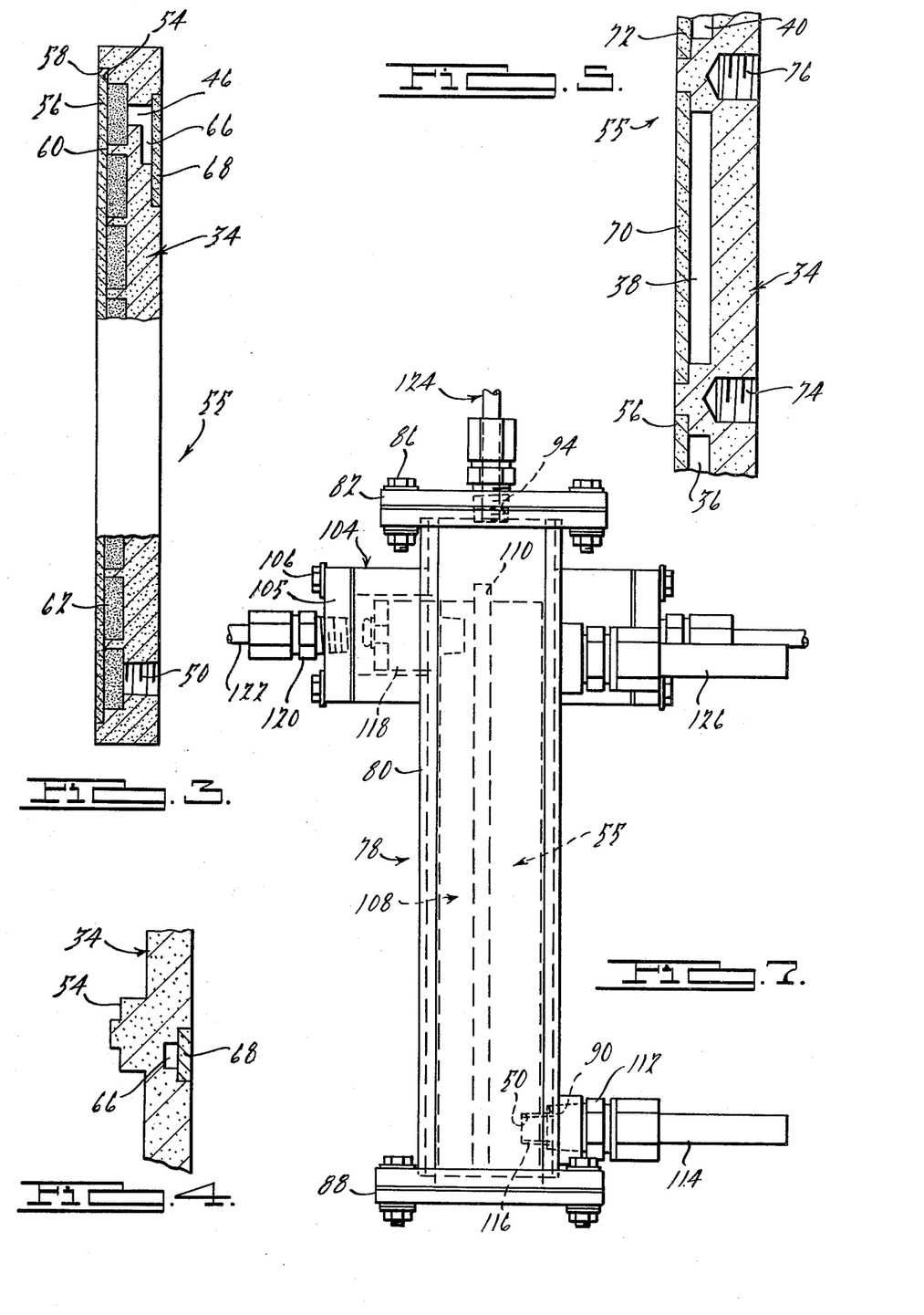
FIG. 3 is a sectional side elevation view of a cathode assembly for a three-stage electrolytic cell according to the present invention.
FIG. 4 is a sectional view of the cathode assembly in FIG. 3 particularly illustrating the passage between adjacent cathode electrode channels.
FIG. 5 is a sectional top elevation view of the cathode assembly illustrated in FIG. 3.
FIG. 7 is a side elevation assembly view of the three-stage electrolytic cell illustrated in FIG. 6.
Figure 4:
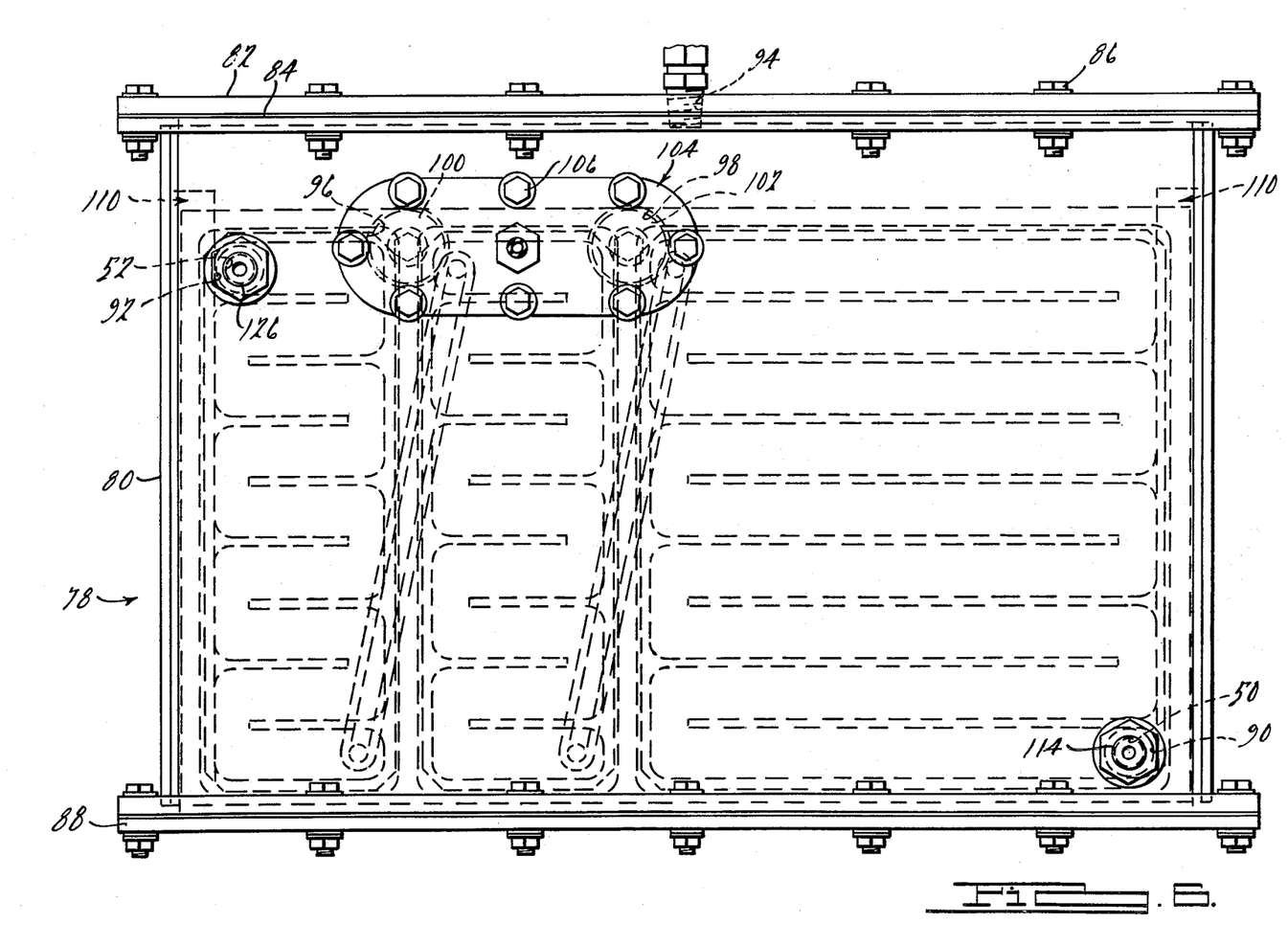

Also shown in FIG. 2 is surface 54, which is formed in the face of the cathode electrode for receiving a porous graphite membrane. This is best illustrated in FIG. 3, which shows a side sectional view of cathode assembly 55. The section illustrated is taken along lines B—B of the cathode electrode in FIG. 2. Porous graphite membrane 56 is disposed into the face of the cathode electrode against surface 54. An integral seal is provided between the membrane and cathode electrode at surfaces 54, 58, and 60 (for each channel ridge). Also illustrated is the packing of graphite particles 62 in channel 36. Further, adjacent to the end (and vent) 46 of channel 36, a portion of passage means 42 is shown. Passage means 46 is generally comprised of slot 66 and cover 68. Cover 68 may be constructed from any suitable material which will provide a gas tight seal over slot 68, such as kynar, teflon, or dense graphite. The passage means is best shown in FIG. 4, which is a sectional view of the cathode electrode in FIG. 2 along lines A—A.

Referring to FIG. 5, a top sectional view of cathode assembly 55 is shown, taken along lines C—C of the cathode electrode in FIG. 2. As illustrated, a separate membrane is provided for each of the three channels in the cathode electrode. Thus, membrane 70 is sealed over the second stage channel 38, and membrane 72 is sealed over the third stage channel 40. Also shown are tapped bores 74 and 76, which receives the terminals used to connect the cathode electrode to the power supply.

Referring to FIG. 6, a front elevation assembly view of a three-stage electrolytic cell 78 according to the present invention is shown. A housing 80 contains cathode assembly 55, a flat plate anode electrode (not shown), and an aqueous hydrochloric acid electrolyte filled to the top of the electrodes. Housing 80 is preferably constructed from polyvinyl chloride (PVC). However, any suitable material which is electrically nonconductive and chemically resistent or inert to the chlorine gas and hydrochloric acid electrolyte environment may be used, as exemplified by kynar, teflon, or lucite. The walls of the housing may be joined and sealed together with a PVC adhesive and/or PVC welding. The top cover 82 of the housing may be detachably mounted to surface 84 of the housing by employing a plurality of bolts 86 spaced around the perimeter of the top cover. The bolts are preferably constructed from titanium, but may be constructed from any suitably resilient and chemically resistent or inert material. A gas tight seal is achieved by interposing a gasket between surface 84 and the perimeter of the top cover. The gasket may be constructed from any suitable chemically inert or resistent material, such as viton, DuPont Armalong or M. L. Gore Gortex. A similar construction may also be used to detachably mount the bottom cover 88 to the housing walls.

Three apertures are provided in the housing for gas transfer into and out of the cell. Aperture 90 is used to connect the stream of chlorine and foreign gases entering the cell with the beginning 50 of the first stage channel 36. Aperture 92 is used to provide a foreign gas vent from the cell at the end 52 of the third stage channel 40. Aperture 94 is used to provide a chlorine gas vent at the top of the cell. Fitted into these apertures are connectors, which will be described with reference to FIG. 7. The remaining aperture in the housing are used to connect the power supply to the anode and cathode electrodes. For instance, apertures 96 and 98 are used to permit electrical terminals 100 and 102 respectively, to be connected to the cathode electrode. An enclosure 104 is provided over the terminals, and may be an integral part of or joined to the housing. As best illustrated in FIG. 7, enclosure 104 includes a cover 105 which is detachably mounted through bolts 106. As in the case of the housing top (and bottom) cover, a gortex gasket is provided between cover 105 and the enclosure walls.

Referring to FIG. 7, a side elevation assembly view of three-stage electrolytic cell 78 is shown. Housing 80 contains cathode assembly 55 and flat plate anode electrode 108. The parallel alignment of and intercell gap between the cathode assembly and anode electrode is provided by a separator member 110 on each side of the cell. The separator members are best illustrated in FIG. 6. These members may be an integral part of or joined to the housing walls.

Fitted into apertures 90, 92, and 94 are male connectors. For instance, connector 112 is fitted into aperture 90 for interfacing tube 114, carrying the stream of chlorine and foreign gases, with the beginning 50 of the first-stage channel 36. Connector 116 provides the final link between connector 112 and the first stage channel. A similar assembly is provided foreign gas aperture 92 and chlorine gas aperture 94 (no insert needed). The connectors and tubes may be constructed from any suitable electrically nonconductive and chemically resistent or inert material, as exemplified by kynar for the connectors and teflon for the tubes.

As in the case of the cathode electrode, two electrical terminals are provided for the anode electrode. In FIG. 7, only one terminal 118 is illustrated. The terminals may be constructed from any suitable electrically conductive and chemically resistent or inert material. However, it is preferred that the electrodes be constructed from the same material used for the anode and cathode electrodes in order to reduce the contact losses. A single connector 120, fitted in the cover 105 of enclosure 104, and associated tube 122 provide the means for connecting the wires from the power supply to the anode terminals. A similar assembly is also employed for the cathode electrode terminals.

As stated previously, one of the principal applications of the present invention is in association with a zinc-chlorine battery. A secondary storage battery of the foregoing type is described in detail in U.S. Pat. No. 3,713,888, issued Jan. 30, 1973 entitled "Process for Electrical Energy Using Solid Halogen Hydrate", and in U.S. Pat. No. 4,166,680, issued March 27, 1979, entitled "Operational Zinc Chlorine Battery Based On A Water Store". These patents are herein incorporated by reference. As set forth in these patents, a zinc-chlorine battery includes two major compartments, a battery stack and a hydrate store. During the charging of the battery, chlorine gas is generated at the positive electrodes in the stack, and is transferred to the store where it is mixed with cold water to form chlorine hydrate. During discharge, heat is provided to the store to release the chlorine gas and transfer it back to the stack, where the reverse electrochemical reactions take place to deliver electrical energy at the battery terminals.

In order to remove any foreign gases present in the battery, a three-stage electrolytic cell according to the present invention could be utilized periodically. The cell could be located outside the battery casing, but it is preferred that it be located in the store compartment, due to the relative availability of space in this compartment. The chlorine and foreign gas inlet tube 114 to cell 78 could be positioned so that its opening is in the gas space of the store compartment, and the chlorine gas outlet tube 124 could be positioned so that its opening is in the gas space of the stack compartment. However, it should be understood that the opposite placement of tubes 114 and 124 could also be employed. In either configuration the foreign gas outlet tube 126 would be positioned so that its opening is outside the battery casing to vent the foreign gases to the atmosphere.

Although the three-stage electrolytic cell 78 may be operated at any time during a battery cycle, it is preferred that the cell be operated during the period following the discharge and preceding the charge of the battery. This is due to the pressure variation between the stack and store compartment during both the charging and discharging of the battery. Generally, during charge and discharge the stack is under a negative pressure (vacuum) and the store is under a positive pressure. A significant negative pressure at the opening of chlorine gas outlet tube 124 will have a detrimental effect on the cell, such as damaging the integrity of the porous graphite membranes (56, 70, or 72) or the seal between the membranes and the cathode electrode. Thus, it is preferred that the gas pressures at the openings of outlet tubes 124 and 126 be approximately equivalent, or at ambient pressure. In order to drive the chlorine and foreign gases through the cell, it is preferred that the gas pressure at the opening of inlet tube 114 be at a positive gas pressure, such as 1 to 2 P.S.I. This positive pressure may be readily achieved by making the appropriate temperature adjustment in the store compartment. For instance, if the opening of tube 114 is in the gas space of the store compartment, then heat may be provided to the water in the store. This will release a portion of the chlorine gas dissolved in the water, increase the gas pressure in the store compartment, and create a stream of chlorine and foreign gases (if any) through the cell.

It will be appreciated by those skilled in the art that various changes and modifications may be made to the single and multiple-stage electrolytic cells described in this specification without departing from the spirit and scope of the invention as defined by the appended claims. The various embodiments which have been set forth were for the purpose of illustration and were not intended to limit the invention.

What is claimed is:

1. A cathode assembly for reducing chlorine gas in an electrolytic cell used for removing foreign gases from a zinc-halogen battery system, comprising:
   (a) an electrode having first and second opposing faces;
   (b) channel means, formed in said first face, for directing the flow of said chlorine and foreign gases through said cathode assembly;
   (c) a porous gas-impermeable membrane sealed to said first face of said electrode over said channel means;
   (d) carbonaceous particles packed in said channel means;
   (e) an inlet port connecting said second face of said electrode with a first end of said channel means; and
   (f) an outlet port connecting said second face of said electrode with a second end of said channel means.

2. The cathode assembly according to claim 1, wherein said channel means is defined at least in part by a plurality of essentially parallel, laterally spaced, interdigitated ridges formed in said first face of said electrode.

3. The cathode assembly according to claim 1, wherein said channel means is packed with graphite particles.

4. The cathode assembly according to claim 3, wherein said electrode is constructed from dense graphite.

5. The cathode assembly according to claim 4, wherein said membrane is constructed from porous graphite.

6. The cathode assembly according to claim 5, wherein said membrane is sealed to said first face of said electrode with an adhesive.

7. The cathode asembly according to claim 6, wherein said adhesive is compared in part of kynar.

8. An electrolytic cell for separating foreign gases from a steam of chlorine and foreign gas comprising:
   (a) a cathode assembly means for reducing chlorine gas into chloride ions, including a cathode electrode having packed bed channel means for directing the flow of said chlorine and foreign gases through said cathode assembly means, membrane means sealed to said cathode electrode over said channel means for permitting the transfer of said chloride ions from said cathode assembly means, inlet means for receiving said stream of chlorine and foreign gases, and outlet means for venting said foreign gases from said cell;
   (b) an anode electrode for oxidizing said chloride ions into chlorine gas;
   (c) partition means, interposed between and sealed to said cathode assembly means and said anode electrode, for aligning and separating said cathode assembly means and said anode electrode;
   (d) means for venting said chlorine gas generated at said anode electrode from said cell;
   (e) an aqueous electrolyte permeating said channel means, said membrane means, and the separation between said cathode assembly means and said anode electrode; and
   (f) electrical power means for providing a potential difference across said anode and cathode electrodes sufficient to cause said chlorine gas reduction and chloride ion oxidation.

9. The electrolytic cell according to claim 8, wherein said chlorine gas venting means is in association with said anode electrode.

10. The electrolytic cell according to claim 8, wherein said chlorine gas venting means is in association with said partition means.

11. The electrolytic cell according to claim 8, wherein said channel means is packed with graphite particles.

12. The electrolytic cell according to claim 8, wherein said inlet means is disposed at the beginning of said channel means, and said outlet means is disposed at the end of said channel means.

13. An electrolytic cell for separating foreign gases from a stream of chlorine and foreign gases, comprising:
   (a) cathode assembly means for reducing chlorine gas into chloride ions, including a cathode electrode having packed bed channel means for directing the flow of said chlorine and foreign gases through said cathode assembly means, membrane means sealed to said cathode electrode over said channel means for permitting the transfer of said chloride ions from said cathode assembly means, inlet means for receiving said stream of chlorine and foreign gases, and outlet means for venting said foreign gases from said cell;
   (b) an anode electrode for oxidizing said chloride ions into chlorine gas;
   (c) a housing for aligning and separating said cathode assembly means and said anode electrode, including means for venting said chlorine gas generated at said anode electrode;
   (d) an aqueous electrolyte contained in said housing; and
   (e) electrical power means for providing a potential difference across said anode and cathode electrodes sufficient to cause said chlorine gas reduction and chloride ion oxidation.

14. The electrolytic cell according to claim 13, wherein said membrane means is liquid permeable but gas impermeable.

15. The electrolytic cell according to claim 13, wherein said channel means is packed with graphite particles.

16. The electrolytic cell according to claim 13 wherein said channel means is defined at least in part by a plurality of essentially parallel, laterally spaced, interdigitated ridges formed in the face of said cathode electrode opposing said anode electrode.

17. The electrolytic cell according to claim 13, wherein said cathode and anode electrode are constructed from dense graphite.

18. The electrolytic cell according to claim 13, wherein said inlet means is disposed at one end of said channel means, and said outlet means is disposed at the other end of said channel means.

19. The electrolytic cell according to claim 13, wherein said housing is constructed from an electrically nonconductive material chemically resistant to said chlorine gas and said electrolyte.

20. The electrolytic cell according to claim 13, wherein said electrolyte is composed at least in part of a chloride ion containing species.

21. The electrolytic cell according to claim 13, wherein said electrolyte is composed of dilute hydrochloric acid.

22. The electrolytic cell according to claim 21, wherein said concentration of hydrochloric acid is between 5 and 15 percent by weight of electrolyte.

23. A multiple-stage electrolytic cell for separating foreign gases from a stream of chlorine and foreign gases, comprising:
(a) cathode assembly means for reducing chlorine gas into chloride ions, including a cathode electrode having a plurality of adjacent packed bed channel means for directing the flow of said chlorine and foreign gases through said cathode assembly means, membrane means sealed to said cathode electrode over each of said channel means for permitting the transfer of said chloride ions from said cathode assembly means, inlet means for receiving said stream of chlorine and foreign gases, outlet means for venting said foreign gases from said cell, and passage means for serially connecting said adjacent channel means;
(b) an anode electrode for oxidizing said chloride ions into chlorine gas;
(c) a housing for aligning and separating said cathode assembly means and said anode electrode, including means for venting said chlorine gas generated at said anode electrode;
(d) an aqueous electrolyte contained in said housing; and
(e) electrical power means for providing a potential difference across said anode and cathode electrodes sufficient to cause said chlorine gas reduction and chloride ion oxidation.

24. The multiple-stage electrolytic cell according to claim 23, wherein said channel means is defined at least in part by a plurality of essentially parallel, laterally spaced, interdigitated ridges formed in the face of said cathode electrode opposing said anode electrode.

25. The multiple-stage electrolytic cell according to claim 23, wherein said passage means are formed in the face of said cathode electrode opposite to said channel means.

26. The multiple-stage electrolytic cell according to claim 23, wherein the active apparent surface area of one of said stages is greater than the other stages.

27. The multiple-stage electrolytic cell according to claim 23, wherein said cell is comprised of three stages.

28. The multiple-stage electrolytic cell according to claim 23, wherein said inlet means is disposed at the beginning of a first stage channel means, and said outlet means is disposed at the end of a last stage channel means.

29. The multiple-stage electrolytic cell according to claim 23, wherein said cell is in association with a zinc-chlorine battery for removing foreign gases from said battery.

* * * * *

UNITED STATES PATENT AND TRADEMARK OFFICE
CERTIFICATE OF CORRECTION

PATENT NO. : 4,257,867
DATED : March 24, 1981
INVENTOR(S) : Hammond, Michael J., Arendell, Mark It is certified that error appears in the above—identified patent and that said Letters Patent is hereby corrected as shown below:

Column 1, line 14, "foreigh" should be --foreign--

Column 1, line 25, "zine" should be --zinc--

Column 2, line 35, "woule" should be --would--

Column 6, line 7, "currect" should be --current--

Signed and Sealed this

Twenty-second Day of December 1981

[SEAL]

Attest:

GERALD J. MOSSINGHOFF

Attesting Officer    Commissioner of Patents and Trademarks